Sept. 8, 1931.         W. KÖHLER         1,822,043
DENTIST'S MODEL
Filed June 8, 1929
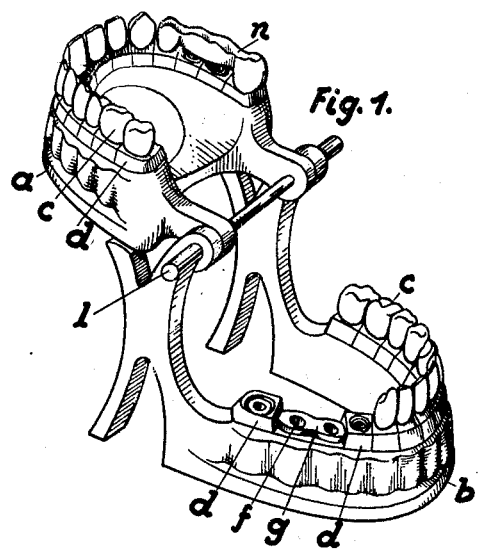
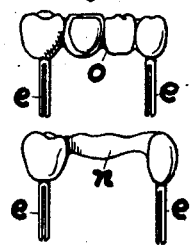
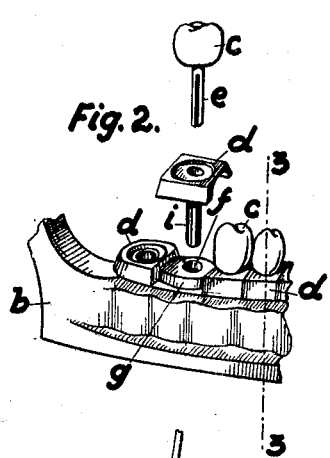
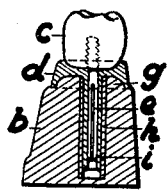
Inventor:
Walter Köhler
by Keenehaur
Atty.

Patented Sept. 8, 1931

1,822,043

UNITED STATES PATENT OFFICE

WALTER KÖHLER, OF MUNICH, GERMANY

DENTIST'S MODEL

Application filed June 8, 1929, Serial No. 369,327, and in Germany June 13, 1928.

My invention relates to dentists' models representing artificial denture with artificial jaws and removable teeth. It is an object of my invention to so design models of this kind that not only diseased or defective dentures may be represented by removing part of the teeth, but that it is also possible to represent by the model dentures which have been cured or repaired. To this end I so design the model that not only single teeth, but also groups of teeth, backings and the like can be exchangeably fitted to the jaws of the model. I further equip my model with removable gums, each of which is subdivided into independent sections which when assembled represent the normal condition of the human gums, one of these sections being adapted to be interposed between each tooth and the jaw.

When a tooth has been extracted the gums shrink and this condition is also considered in my model by providing bosses on the artificial jaws which are adapted to fit cavities in the gum sections so that the artificial jaw without the gum sections represents the condition of the jaw after the extraction of a tooth, and by interposing a gum section the normal condition, that is, the condition before shrinking is represented.

By these means I provide a universal model in which all conditions which may be found in the human teeth, can be represented and demonstrated, not only with separate teeth but also with bridge work, and it is possible to show anything that is important for dental surgery.

In the drawings affixed to this specification and forming part thereof a model embodying my invention is illustrated diagrammatically by way of example.

In the drawings

Fig. 1 is a perspective illustration showing the complete model,

Fig. 2 illustrates part of the lower jaw of the model, drawn to a larger scale and with an artificial tooth and a gum section shown separately, Fig. 3 is a section on the line 3—3 in Fig. 2, Figs. 4 and 5 illustrate two types of backings, Fig. 6 illustrates a pin for lifting parts inserted in the jaw.

Referring to the drawings, and first to Fig. 1, $a$ and $b$ are the upper and the lower jaws, respectively, which may be made of plaster of Paris, porcelain, papier maché, metal or the like, and are connected by hinges having a pin 1. Teeth are indicated by $c$ and gum sections by $d$, which, as described in the introduction, serve for representing the normal or unshrunk condition of the gums. Holes in the jaws $a$ and $b$ are indicated by $f$ which holes are preferably provided with liners $h$, as shown in Fig. 3, and $g$ is a boss or hump surrounding the upper end of each hole and representing the gum, after it has shrunk on the jaw upon the extraction of a tooth, the gum sections being recessed at their lower faces to fit the bosses $g$. $i$ is a tubular extension from the bottom of the gum section which fits the insertion $h$, $c$ is a tooth, and $e$ is a downwardly projecting pin on the tooth, which fits the tube $i$. The pins $e$ and the tube $i$ may be slotted so that they will fit the tube $i$ and the liner $h$, respectively, at resilient pressure.

When it is desired to remove a gum section $d$, the tooth $c$ with its pin $e$ is first extracted from the tube $i$ and thereupon a pin $k$ (Fig. 6) is inserted in the tube $i$ which engages below the end of the tube $i$ with its boss $m$ so as to lift the gum section from its seat on the boss $g$.

When it is desired to represent a given condition of a denture, gum sections $d$ are inserted in the jaws for those teeth $c$ which are in good condition and the teeth $c$ are inserted in the tubes $i$ of the intermediate parts. The gums of teeth which have just been extracted so that the gums have not yet shrunk, are represented by sections $d$ without teeth as shown at the right for the lower jaw $b$. For the two teeth intermediate these parts, the gums are supposed to have shrunk and therefore the bosses $g$ are exposed here. A similar case is illustrated at the left of the upper jaw $a$ and here bridge work $n$, Fig. 5, has been provided for bridging the two intermediate teeth but if desired bridge work $o$ as shown in Fig. 4, with a complete set of teeth, may be inserted instead of *n*.

My invention is not limited to the representation of normal jaws and of teeth in good condition, but the model may also be used for representing protuberances of the jaws, wounds, deformed teeth and the like.

It will be understood that my model is justly termed a "universal" model as it is possible to demonstrate all that is important. The model is useful not only as a demonstration model for students but also for practising dentists who, with the model, are in a position to show to their patients the operations which they would suggest.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In a dentist's model having an artificial jaw and teeth removably connected with said jaw the combination with said teeth of sectional parts of a gum model, each sectional part being adapted to be interposed between a tooth and said jaw.

2. In a dentist's model having an artificial jaw and teeth removably connected with said jaw the combination with said teeth of sectional parts of a gum model, each sectional part being adapted to be interposed between a tooth and said jaw, and a boss on said jaw representing a shrunk gum and adapted to fit a cavity in one of said sectional parts.

3. In a dentist's model having an artificial jaw and removable teeth the combination with said teeth of sectional parts of a gum model, each of said sectional parts being adapted to be interposed between a tooth and said jaw and a tubular extension on each sectional part adapted to fit in a hole in said jaw.

4. In a dentist's model having an artificial jaw and removable teeth the combination with said teeth of sectional parts of a gum model, each sectional part being adapted to be interposed between a tooth and said jaw and a resilient tubular extension on each sectional part adapted to fit in a hole in said jaw.

5. In a dentist's model having an artificial jaw and removable teeth the combination, with said teeth, of sectional parts of a gum model, each sectional part being adapted to be interposed between a tooth and said jaw, a resilient tubular extension on each sectional part adapted to fit in a hole in said jaw, and a pin on each tooth adapted to fit in one of said tubular extensions.

6. In a dentist's model having artificial jaws and removable teeth the combination with said teeth of sectional parts of a gum model, each sectional part being adapted to be interposed between a tooth and said jaw, a resilient tubular extension on each sectional part adapted to fit a hole in said jaw and a resilient pin on each tooth adapted to fit in one of said tubular extensions.

7. In a dentist's model having an artificial jaw and removable teeth the combination with said teeth of sectional parts of a gum model, each section being adapted to be interposed between a tooth and said jaw, some of said teeth being connected by bridge work.

In testimony whereof I affix my signature.

WALTER KÖHLER.